US010400610B2

United States Patent
Zemitis et al.

(10) Patent No.: US 10,400,610 B2
(45) Date of Patent: Sep. 3, 2019

(54) TURBINE BLADE HAVING A TIP SHROUD NOTCH

(71) Applicant: General Electric Company, Schenectady, NY (US)

(72) Inventors: William Scott Zemitis, Simpsonville, SC (US); Richard Ryan Pilson, Greer, SC (US); Melbourne James Myers, Woodruff, SC (US)

(73) Assignee: General Electric Company, Schenectady, NY (US)

( * ) Notice: Subject to any disclaimer, the term of this patent is extended or adjusted under 35 U.S.C. 154(b) by 317 days.

(21) Appl. No.: 15/431,939

(22) Filed: Feb. 14, 2017

(65) Prior Publication Data

US 2018/0230816 A1 Aug. 16, 2018

(51) Int. Cl.
| F01D 5/20  | (2006.01) |
| F01D 5/22  | (2006.01) |
| F01D 11/08 | (2006.01) |
| F01D 25/24 | (2006.01) |

(52) U.S. Cl.
CPC ............... *F01D 5/20* (2013.01); *F01D 11/08* (2013.01); *F01D 25/24* (2013.01); *F01D 5/225* (2013.01); *F05B 2240/11* (2013.01); *F05D 2240/81* (2013.01); *F05D 2260/20* (2013.01); *F05D 2260/30* (2013.01)

(58) Field of Classification Search
CPC . F01D 5/20; F01D 11/08; F01D 25/24; F01D 5/225; F01D 11/122; F05D 2260/20; F05D 2240/81; F05D 2260/30; F05D 2240/307; F05D 2240/55; F05D 2260/96; F05D 2250/75; F05B 2240/11

USPC .......................................................... 416/191
See application file for complete search history.

(56) References Cited

U.S. PATENT DOCUMENTS

| 5,154,581 | A  | * | 10/1992 | Borufka | F01D 5/225 |
|           |    |   |         |         | 415/173.6  |
| 6,893,216 | B2 | * | 5/2005  | Snook   | F01D 5/225 |
|           |    |   |         |         | 415/173.1  |
| 7,001,152 | B2 | * | 2/2006  | Paquet  | F01D 5/225 |
|           |    |   |         |         | 29/889.21  |
| 7,063,509 | B2 | * | 6/2006  | Snook   | F01D 5/141 |
|           |    |   |         |         | 416/189    |
| 7,066,713 | B2 | * | 6/2006  | Dube    | F01D 5/143 |
|           |    |   |         |         | 415/173.5  |
| 7,134,838 | B2 | * | 11/2006 | Dube    | F01D 5/147 |
|           |    |   |         |         | 415/173.5  |
| 7,527,477 | B2 | * | 5/2009  | Norton  | F01D 5/225 |
|           |    |   |         |         | 29/889.2   |
| 7,628,587 | B2 | * | 12/2009 | McFeat  | F01D 5/141 |
|           |    |   |         |         | 416/189    |

(Continued)

FOREIGN PATENT DOCUMENTS

EP          1507064 B1      5/2016

*Primary Examiner* — Sizo B Vilakazi
*Assistant Examiner* — Brian R Kirby
(74) *Attorney, Agent, or Firm* — Armstrong Teasdale LLP

(57) ABSTRACT

A turbine blade includes an airfoil that extends from a root end to a tip end, and a tip shroud extending from the tip end. The tip shroud includes a shroud plate that includes a pressure side edge. The pressure side edge includes a primary contact surface configured to couple against an adjacent tip shroud, and a notch extending at least partially downstream from the primary contact surface.

18 Claims, 6 Drawing Sheets

(56) References Cited

U.S. PATENT DOCUMENTS

| | | | | |
|---|---|---|---|---|
| 7,762,779 B2* | 7/2010 | Zemitis | F01D 5/225 | 415/173.4 |
| 7,887,295 B2* | 2/2011 | Brittingham | F01D 5/141 | 416/189 |
| 7,976,280 B2* | 7/2011 | Brittingham | F01D 5/147 | 416/189 |
| 8,043,061 B2* | 10/2011 | Chiurato | F01D 5/225 | 416/189 |
| 8,057,186 B2 | 11/2011 | Brittingham | | |
| 8,322,986 B2* | 12/2012 | DeSander | F01D 5/187 | 416/96 R |
| 8,721,289 B2* | 5/2014 | John | F01D 5/225 | 416/191 |
| 8,807,928 B2 | 8/2014 | Kareff et al. | | |
| 9,322,281 B2* | 4/2016 | Schlemmer | F01D 5/225 | |
| 2008/0019835 A1* | 1/2008 | McFeat | F01D 5/141 | 416/189 |
| 2012/0003078 A1* | 1/2012 | Pikul | F01D 5/225 | 415/173.1 |
| 2012/0070308 A1* | 3/2012 | Naik | F01D 5/20 | 416/97 R |
| 2012/0195766 A1* | 8/2012 | Cohin | F01D 5/225 | 416/241 A |
| 2014/0147283 A1 | 5/2014 | Ward, Jr. et al. | | |
| 2014/0154082 A1* | 6/2014 | Shinn | B23K 1/0018 | 416/191 |
| 2015/0017003 A1* | 1/2015 | Shaffer | F01D 5/225 | 416/182 |
| 2015/0064010 A1* | 3/2015 | Zhang | F01D 5/186 | 416/189 |
| 2015/0369058 A1* | 12/2015 | Negri | F01D 5/225 | 416/241 R |
| 2016/0032733 A1* | 2/2016 | Plante | F01D 5/225 | 416/189 |
| 2016/0169052 A1* | 6/2016 | Balliel | F01D 25/32 | 416/96 R |
| 2018/0016918 A1* | 1/2018 | Skura | F01D 5/225 | |

* cited by examiner

TURBINE BLADE HAVING A TIP SHROUD NOTCH

BACKGROUND OF THE INVENTION

The field of the disclosure relates generally to rotary machines, and more particularly, to a tip shroud of a turbine blade that includes notch features.

At least some known rotary machines include a compressor, a combustor coupled downstream from the compressor, a turbine coupled downstream from the combustor, and a rotor shaft rotatably coupled between the compressor and the turbine. Some known turbines include at least one rotor disk coupled to the rotor shaft, and a plurality of circumferentially-spaced turbine blades that extend outward from each rotor disk to define a stage of the turbine. Each turbine blade includes an airfoil that extends radially outward from a platform towards a turbine casing.

At least some known turbine blades include a shroud that extends from an outer tip end of the airfoil to reduce gas flow leakage between the airfoil and the turbine casing. An operational life cycle of at least some latter stage turbine blade tip shrouds may be limited by creep. Creep is the tendency of a material to deform over time when exposed to a combination of mechanical loading and high temperature. Turbine shroud creep rate may be greatly impacted by the high temperatures often seen at the shroud. To counter the effects of high temperatures, at least some known turbine blades include an internal cooling circuit, such as an interior tip shroud core cavity, or plenum, and/or passages that run transversely from the plenum toward the outer edges of the shroud. However, known tip shroud core plenums generally increase the complexity and expense of manufacture of the tip shroud, and impose design limits on other properties of the shroud, such as shape and thickness. Additionally, at least some known tip shrouds are shaped to reduce an area of the shroud that requires cooling. However, an ability to reduce the shroud area is limited by a need for the shrouds to cooperate structurally with adjacent shrouds.

BRIEF DESCRIPTION

In one aspect, a turbine blade is provided. The turbine blade includes an airfoil that extends from a root end to a tip end, and a tip shroud extending from the tip end. The tip shroud includes a shroud plate that includes a pressure side edge. The pressure side edge includes a primary contact surface configured to couple against an adjacent tip shroud, and a notch extending at least partially downstream from the primary contact surface.

In another aspect, a turbine blade is provided. The turbine blade includes an airfoil that extends from a root end to a tip end, and a tip shroud extending from the tip end. The tip shroud includes a shroud plate that includes a pressure side edge. The pressure side edge includes a notch. The turbine blade also includes a first shroud rail adjacent a leading edge of the shroud plate, and a second shroud rail downstream from the first shroud rail. A downstream pressure side edge of the second rail blends into a radially outer edge of the notch in a smooth, continuous arcuate profile that extends downstream from at least a radial midpoint of the second rail.

In another aspect, a turbine blade is provided. The turbine blade includes an airfoil that extends from a root end to a tip end, and a tip shroud extending from the tip end. The tip shroud includes a shroud plate that includes a radially inner surface, a radially outer surface, and a thickness defined therebetween. The shroud plate also includes a pressure side edge. The pressure side edge includes a notch. The notch includes a transition point defined at a circumferentially inward-most point along the notch. The thickness of at least a first location along the notch upstream from the transition point is at least twice the thickness of at least a second location along the notch downstream from the transition point.

DETAILED DESCRIPTION OF THE INVENTION

The exemplary methods and systems described herein overcome at least some disadvantages of known turbine blades by providing a tip shroud that includes a shroud plate having a notch defined along a pressure side edge. In some embodiments, a primary contact surface of the pressure side edge is configured to couple against an adjacent tip shroud, and the notch extends at least partially downstream from the primary contact surface. In particular, in some such embodiments, a specific shape of the notch enables a local shroud plate thickness along the primary contact surface and/or an upstream edge of the notch to be increased. Additionally or alternatively, the tip shroud includes a leading shroud rail and a second, downstream shroud rail, and a downstream pressure side edge of the second rail blends into a radially outer edge of the notch in a smooth, continuous arcuate profile. Additionally or alternatively, a local shroud plate thickness of at least a first location along an upstream portion of the notch is at least twice the thickness of at least a second location along a downstream portion of the notch. In some embodiments, the notch and associated features result in a corresponding absence of material of the shroud plate along the pressure side edge that would otherwise need to be cooled. Thus, for example, a position of transverse cooling passages defined within the shroud plate may be selected such that no passage exits the shroud plate proximate to the notch.

Unless otherwise indicated, approximating language, such as "generally," "substantially," and "about," as used herein indicates that the term so modified may apply to only an approximate degree, as would be recognized by one of ordinary skill in the art, rather than to an absolute or perfect degree. Additionally, unless otherwise indicated, the terms "first," "second," etc. are used herein merely as labels, and are not intended to impose ordinal, positional, or hierarchical requirements on the items to which these terms refer. Moreover, reference to, for example, a "second" item does not require or preclude the existence of, for example, a "first" or lower-numbered item or a "third" or higher-numbered item. As used herein, the term "upstream" refers to a forward or inlet end of a gas turbine engine, and the term "downstream" refers to an aft or nozzle end of the gas turbine engine.

Figure 1:
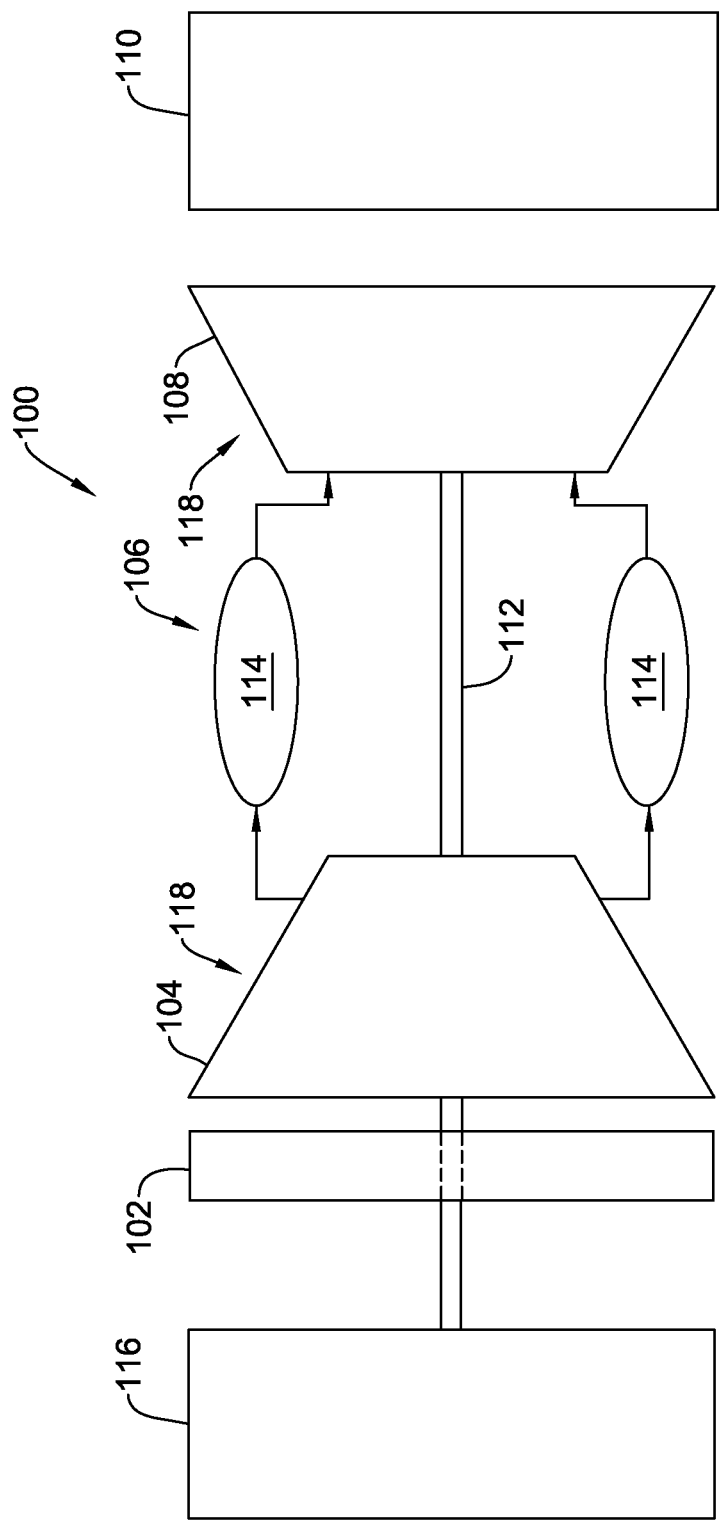
FIG. 1 is a schematic view of an exemplary turbine engine assembly.

FIG. 1 is a schematic view of an exemplary rotary machine 100, i.e., a turbomachine, and more specifically a turbine engine. In the exemplary embodiment, turbine engine 100 is a gas turbine engine. Alternatively, turbine engine 100 may be any other turbine engine and/or rotary machine, including, without limitation, a steam turbine engine, a gas turbofan aircraft engine, other aircraft engine, a wind turbine, a compressor, and a pump. In the exemplary embodiment, turbine engine system 100 includes an intake section 102, a compressor section 104 that is coupled downstream from intake section 102, a combustor section 106 that is coupled downstream from compressor section 104, a turbine section 108 that is coupled downstream from combustor section 106, and an exhaust section 110 that is coupled downstream from turbine section 108. Turbine section 108 is coupled to compressor section 104 via a rotor shaft 112. In the exemplary embodiment, combustor section 106 includes a plurality of combustors 114. Combustor section 106 is coupled to compressor section 104 such that each combustor 114 is in flow communication with the compressor section 104. Turbine section 108 is further coupled to a load 116 such as, but not limited to, an electrical generator and/or a mechanical drive application. In the exemplary embodiment, each compressor section 104 and turbine section 108 includes at least one rotor assembly 118 that is coupled to rotor shaft 112.

During operation, intake section 102 channels air towards compressor section 104. Compressor section 104 compresses air and discharges compressed air into combustor section 106 and towards turbine section 108 (shown in FIG. 1). The majority of air discharged from compressor section 104 is channeled towards combustor section 106. More specifically, pressurized compressed air is channeled to combustors 114 (shown in FIG. 1) wherein the air is mixed with fuel and ignited to generate high temperature combustion gases. The combustion gases are channeled towards a combustion gas path 232 (shown in FIG. 2), wherein the gases impinge upon turbine blades 204 (shown in FIG. 2) and stator vanes 202 (shown in FIG. 2) of turbine section 108 to facilitate imparting a rotational force on rotor assembly 118. At least a portion of the combustion gas that impinges turbine blades 204, is channeled between a tip shroud 236 (shown in FIG. 2) and turbine casing 210 (shown in FIG. 2).

Figure 2:
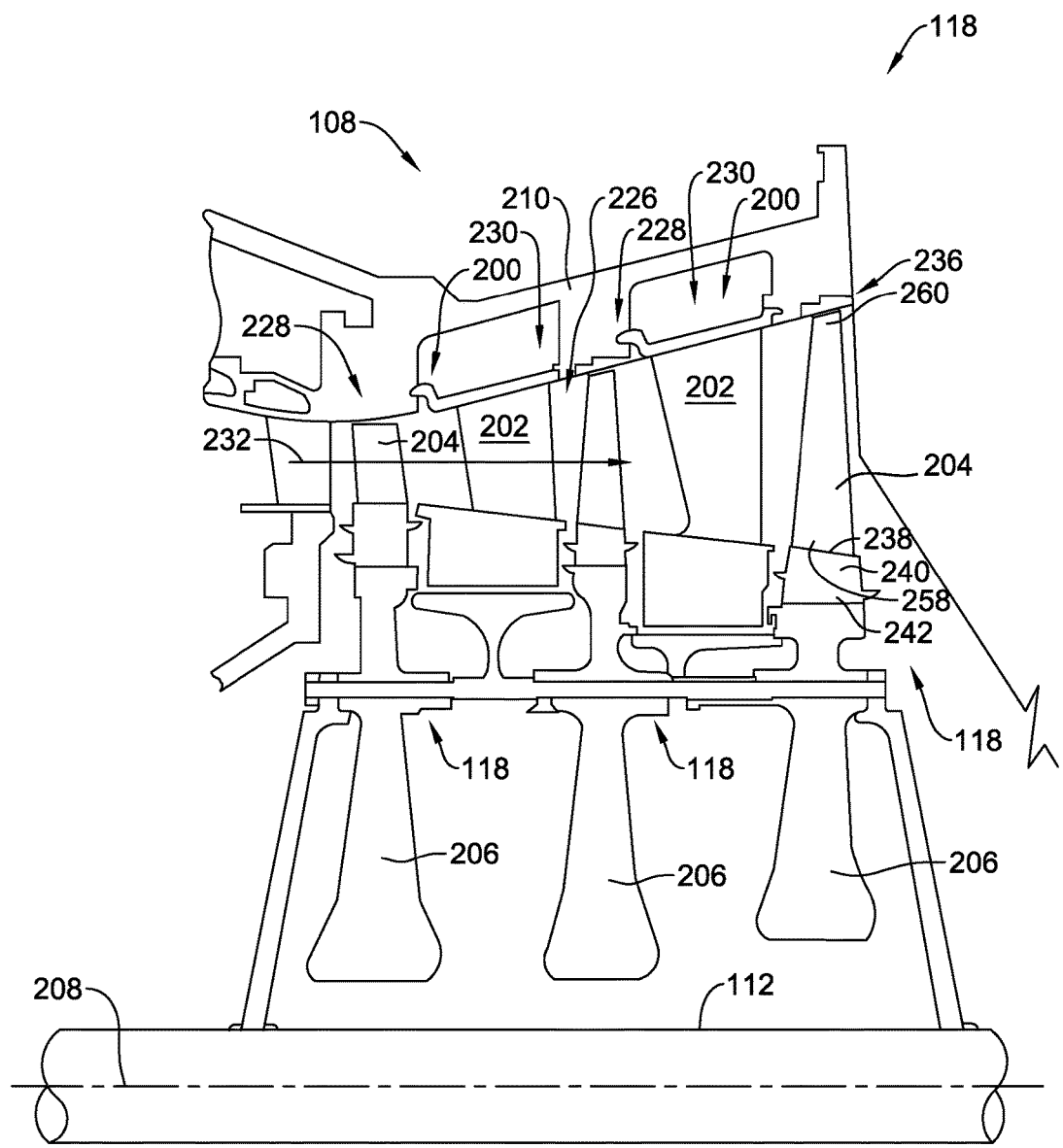
FIG. 2 is a partial sectional view of a portion of an exemplary rotor assembly that may be used with the turbine engine shown in FIG. 1.
Figure 3:
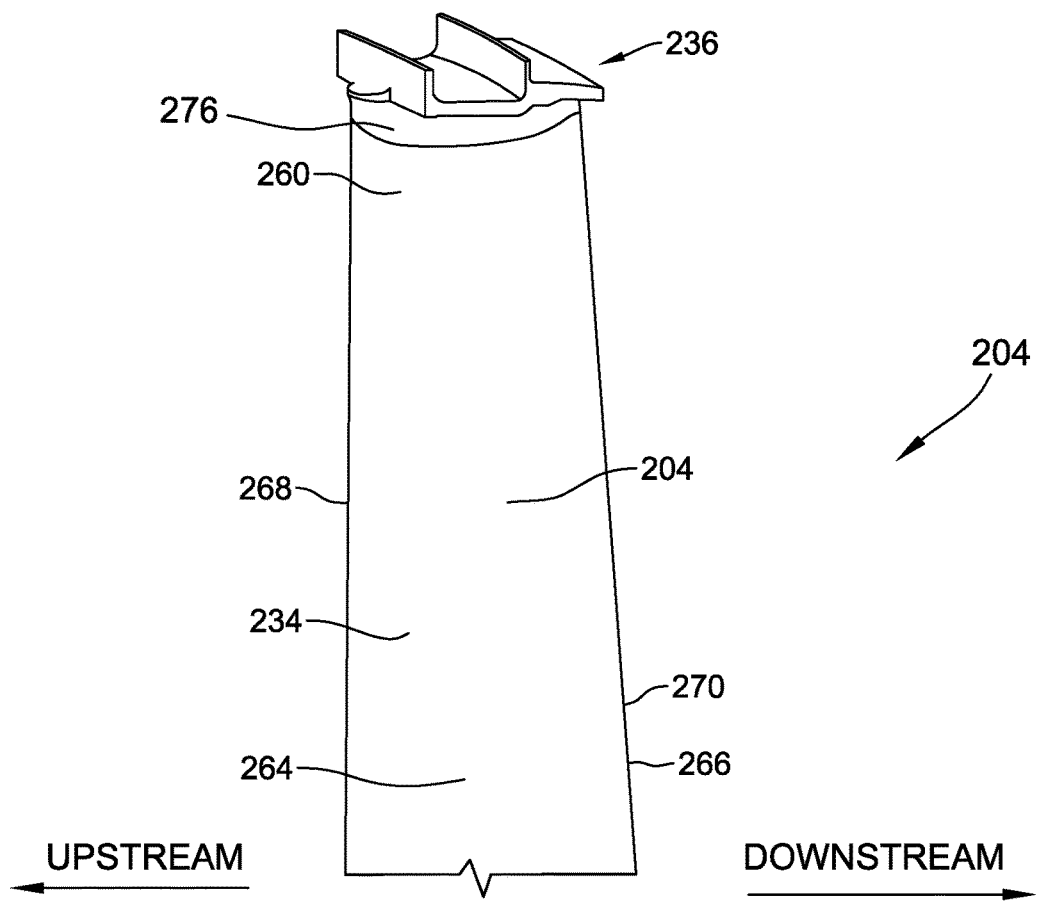
FIG. 3 is a perspective view of a pressure side of an exemplary turbine blade that may be used with the rotor assembly shown in FIG. 2.

FIG. 2 is a partial sectional view of a portion of an exemplary rotor assembly 118. FIG. 3 is a perspective view of a pressure side 264 of an exemplary turbine blade 204 of rotor assembly 118. In the exemplary embodiment, turbine section 108 includes a plurality of stages 200 that each include a stationary row 230 of stator vanes 202 and a corresponding row 228 of rotating turbine blades 204. Turbine blades 204 in each row 228 are spaced-circumferentially about, and each extends radially outward from, a rotor disk 206. Each rotor disk 206 is coupled to rotor shaft 112 and rotates about a centerline axis 208 that is defined by rotor shaft 112. A turbine casing 210 extends circumferentially about rotor assembly 118 and stator vanes 202. Stator vanes 202 are each coupled to turbine casing 210 and each extends radially inward from casing 210 towards rotor shaft 112. A combustion gas path 232 is defined between turbine casing 210 and each rotor disk 206. Each row 228 and 230 of turbine blades 204 and stator vanes 202 extends at least partially through a portion of combustion gas path 232.

In the exemplary embodiment, each turbine blade 204 includes an airfoil 234, a tip shroud 236, a platform 238, a shank 240, and a dovetail 242. Airfoil 234 extends generally radially between platform 238 and tip shroud 236. Platform 238 extends between airfoil 234 and shank 240 and is oriented such that each airfoil 234 extends radially outwardly from platform 238 towards turbine casing 210. Shank 240 extends radially inwardly from platform 238 to dovetail 242. Dovetail 242 extends radially inwardly from shank 240 and enables turbine blades 204 to securely couple to rotor disk 206. In the exemplary embodiment, airfoil 234 extends radially between a root end 258, adjacent to platform 238, and a tip end 260

In the exemplary embodiment, airfoil 234 extends radially outward from a root end 258, adjacent to platform 238, to a tip end 260 positioned adjacent to turbine casing 210. In the exemplary embodiment, airfoil 234 has a pressure side 264 and an opposite suction side 266. Each side 264 and 266 extends generally axially between a leading edge 268 and a trailing edge 270. Pressure side 264 is generally concave and suction side 266 is generally convex. In the exemplary embodiment, tip shroud 236 extends from tip end 260 of airfoil 234 and between tip end 260 and turbine casing 210.

Figure 4:
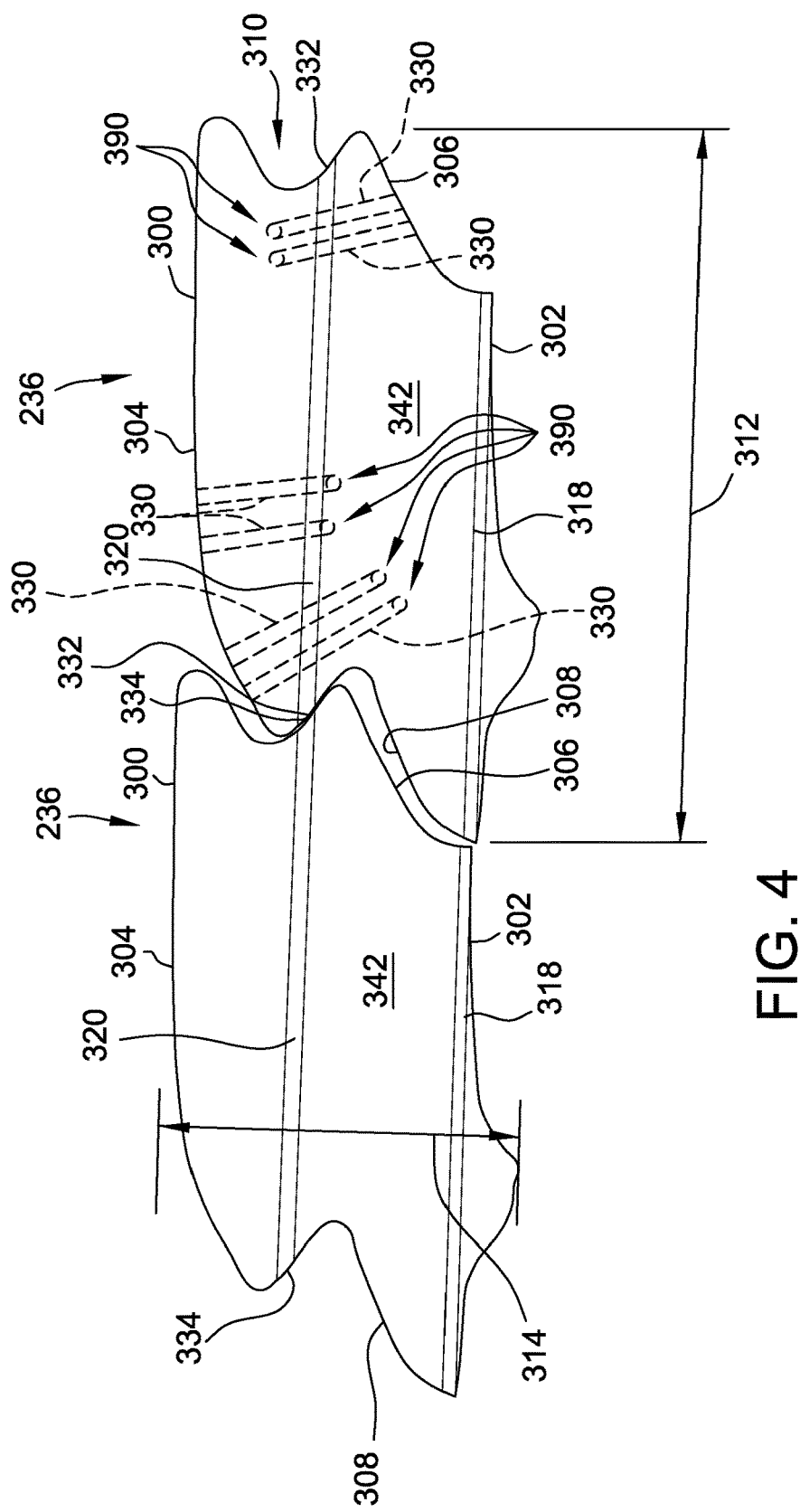
FIG. 4 is a top view of an adjacent pair of exemplary tip shrouds that may be used with the turbine blade shown in FIG. 3.
Figure 5:
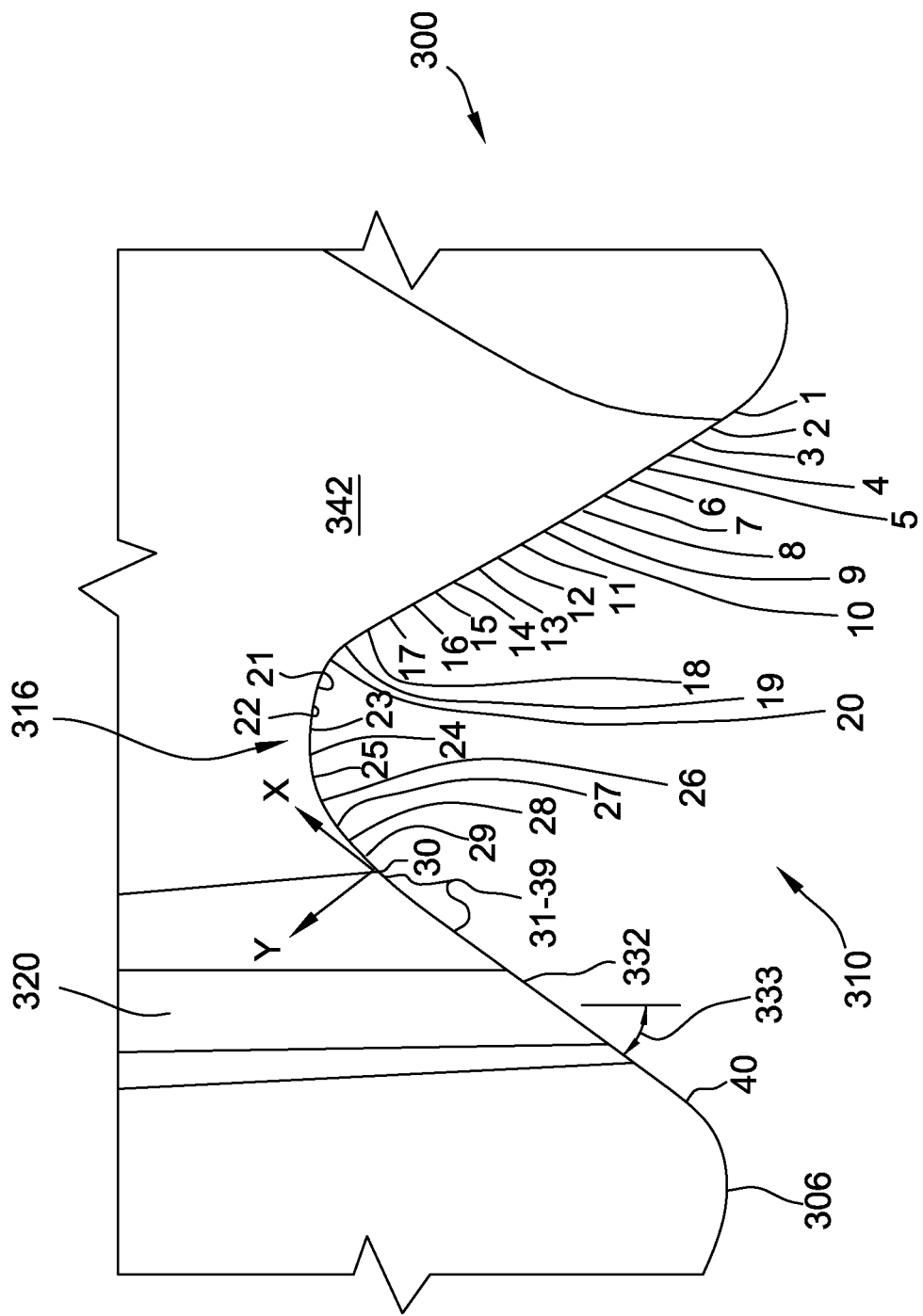
FIG. 5 is a top view of an exemplary tip shroud notch of each of the tip shrouds shown in FIG. 4.
Figure 6:
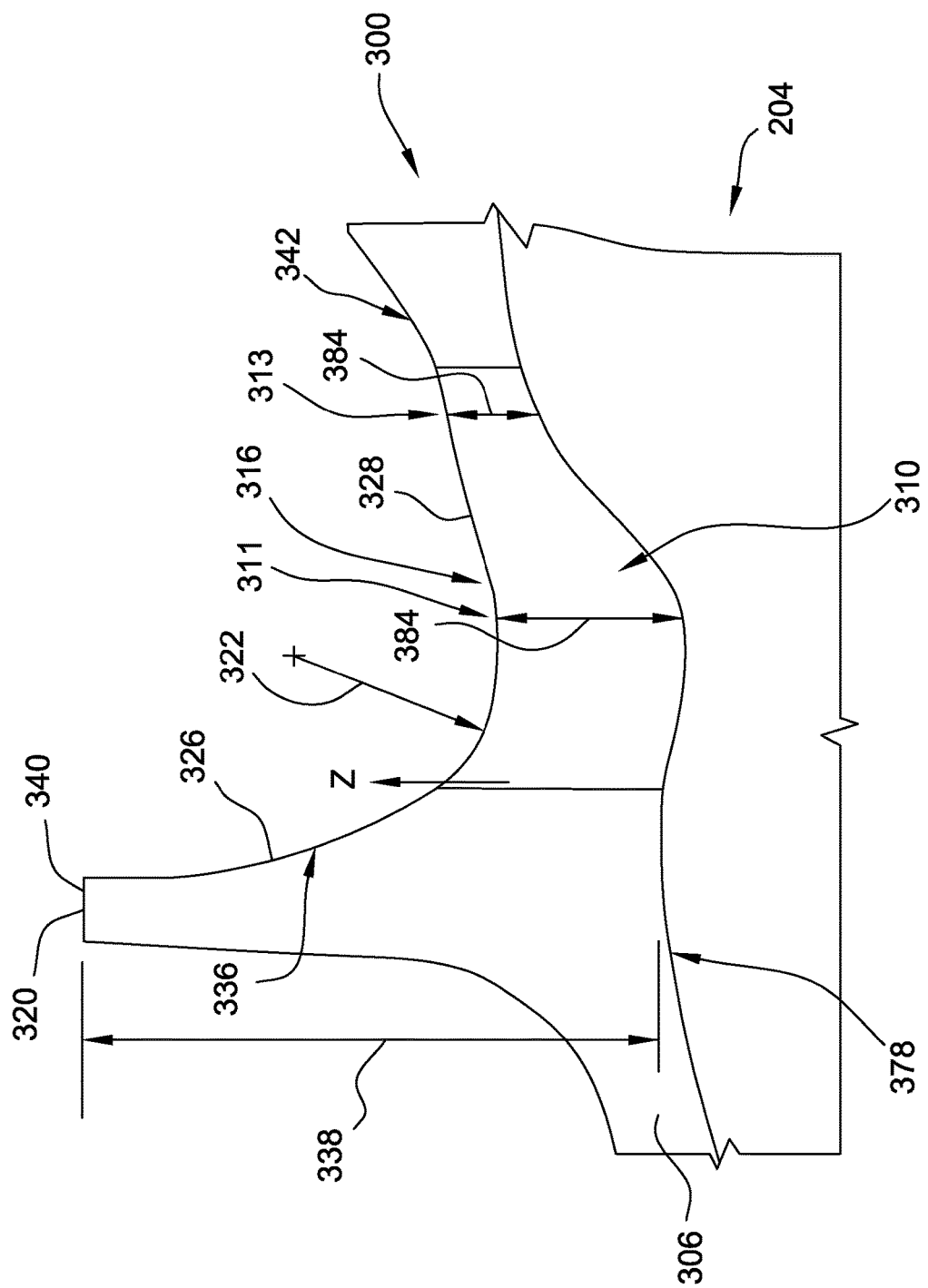
FIG. 6 is a side elevation view of the tip shroud notch shown in FIG. 5.

FIG. 4 is a top view of an adjacent pair of exemplary tip shrouds 236. FIG. 5 is a top view of an exemplary tip shroud notch 310 of tip shroud 236. FIG. 6 is a side elevation view of tip shroud notch 310. Although some described features of tip shroud 236 are shown in only one of the pair of tip shrouds 236 illustrated in FIG. 4, this is for convenience of illustration only.

With reference to FIGS. 3-6, in the exemplary embodiment, tip shroud 236 extends from tip end 260 of airfoil 234 and between tip end 260 and turbine casing 210 (shown in FIG. 2). In the exemplary embodiment, shroud plate 300 is generally rectangular and extends axially between a leading edge 302 and an opposite trailing edge 304, and circumferentially between a pressure side edge 306 and an opposite circumferentially-spaced second, or suction side edge 308.

In the exemplary embodiment, shroud plate 300 has a circumferential width 312 defined between side edges 306 and 308. Shroud plate 300 also has an axial length 314 measured between leading and trailing edges 302 and 304. In the exemplary embodiment, tip shroud 236 includes a first shroud rail 318 and a second shroud rail 320 downstream from first shroud rail 318. Shroud rails 318 and 320 extend radially outward from shroud plate 300 towards turbine casing 210 (shown in FIG. 2). In alternative embodiments, tip shroud 236 may include any suitable number of shroud rails, including zero. In one embodiment, shroud rails 318 and 320 are formed separately from, and coupled to, shroud plate 300. In an alternative embodiment, shroud rails 318 and 320 are formed integrally with shroud plate 300.

A primary contact surface 332 of pressure side edge 306 is configured to couple directly against a complementary primary contact surface 334 of suction side edge 308 of an adjacent tip shroud 236, as illustrated in FIG. 4, when rotor assembly 118 (shown in FIG. 2) is in operation. In the exemplary embodiment, primary contact surface 332 includes a pressure side edge of second rail 320, and primary contact surface 334 includes a suction side edge of second rail 320. In alternative embodiments, primary contact surface 332 is defined at any suitable location along pressure side edge 306. Moreover, primary contact surface 334 is defined at any suitable location along suction side edge 308.

In addition, tip shroud notch 310 is defined in pressure side edge 306. In the exemplary embodiment, notch 310 extends at least partially downstream from primary contact surface 332. In alternative embodiments, pressure side notch 310 is defined at any suitable location along pressure side edge 306. A transition point 316 is defined at a circumferentially inward-most point along notch 310.

For purposes of description, an X-Y plane is defined transverse to a radial direction of blade 204 by a pair of orthogonal axes X and Y. In certain embodiments, as best shown in FIG. 5, a profile of primary contact surface 332 projected onto the X-Y plane is defined by a substantially straight line along the X axis, such that primary contact surface 332 is oriented at a contact angle 333 with respect to the circumferential direction. For example, contact angle 333 is within a range of from about 30 degrees to about 65 degrees to facilitate sliding engagement between primary contact surface 332 and complementary primary contact surface 334 of suction side edge 308 of an adjacent blade 204 as blades 204 untwist from a pre-twisted condition when rotor assembly 118 (shown in FIG. 2) transitions into operation.

Additionally, a profile of notch 310 projected onto the X-Y plane is defined by a smooth, generally concave profile downstream from primary contact surface 332. In some such embodiments, notch 310 results in a corresponding absence of material of shroud plate 300 along pressure side edge 306 that would otherwise need to be cooled. For example, notch 310 enables transverse cooling passages 330 defined in shroud plate 300 to be positioned to cool alternative areas of shroud plate 300, as described below, thereby reducing thermal stresses throughout tip shroud 236. Moreover, the smooth profile of notch 310 in the X-Y plane facilitates reduced mechanical stress concentrations in tip shroud 236 proximate to notch 310.

For example, in the exemplary embodiment, shroud plate 300 has axial length 314 within a range of from about 3 inches to about 4 inches, the profile in the X-Y plane of primary contact surface 332 is defined by a second plurality of points {30, 31, . . . , 40} that lie in a substantially straight line along the X axis, and the profile in the X-Y plane of notch 310 is defined downstream of primary contact surface 332 by a first plurality of points {1, 2, . . . , 29} joined with smooth continuous arcs. Exemplary coordinates in the X-Y plane for each of the first and second plurality of points are given in Table 1 below. In certain embodiments, notch 310 having a profile in the X-Y plane defined by first plurality of points {1, 2, . . . , 29} provides a particularly beneficial reduction in mechanical stress and cooling requirements along pressure side edge 306, thus reducing susceptibility of tip shroud 236 to creep and improving an operational life of blade 204.

In addition, certain embodiments include variations in the coordinate values set forth in Table 1 while preserving the advantages described above to a substantial degree. For example, in some embodiments, at least one of manufacturing tolerances and protective coatings cause each coordinate value listed in Table 1 to vary, while preserving the advantages described above to a substantial degree. Accordingly, the values given in Table 1 are for a nominal profile, and are subject to a tolerance. It will therefore be appreciated that typical tolerances, i.e., ±values, including any coating thicknesses, are additive to the coordinates given in Table 1.

In the exemplary embodiment, a plurality of transverse cooling passages 330 is defined within shroud plate 300. For clarity of illustration, cooling passages 330 are shown only in one of tip shrouds 236 in FIG. 4. Moreover, in certain embodiments, a position of transverse cooling passages 330 is selected such that no passage 330 exits shroud plate 300 proximate notch 310. For example, but not by way of limitation, notch 310 defined in pressure side edge 306 reduces or eliminates a requirement to provide active cooling directly to pressure side edge 306 proximate to notch 310. In some such embodiments, the reduced cooling requirements further facilitate each transverse cooling passage 330 being coupled directly in flow communication to a corresponding radially extending cooling passage 390 defined in airfoil 234, such that tip shroud 236 may not require a tip shroud plenum, simplifying a design and manufacture of tip shroud 236. In alternative embodiments, at least one transverse cooling passage 330 exits shroud plate 300 proximate to notch 310, and/or tip shroud 236 includes a tip shroud plenum. In other alternative embodiments, tip shroud 236 does not include transverse cooling passages 330.

In alternative embodiments, pressure side notch 310 defines any suitable contour that enables tip shroud 236 to function as described herein.

In certain embodiments, a downstream pressure side edge 326 of second rail 320 blends into a radially outer edge 328 of notch 310 upstream from transition point 316 in a smooth, continuous arcuate profile that extends downstream from at least a radial midpoint 336 of second rail 320. In some such embodiments, the smooth, continuous arcuate profile defined by downstream pressure side edge 326 downstream from at least radial midpoint 336, and by radially outer edge 328 of notch 310 upstream from transition point 316, facilitates reduced mechanical stress concentrations in tip shroud 236 proximate to notch 310, and also provides added material to support loads transferred across primary contact surface 332, as compared to second shroud rail 320 extending substantially linearly from radial midpoint 336 into a typical fillet (not shown) on shroud plate 300.

For example, in the exemplary embodiment, second rail 320 has a thickness 338, defined between a radially inner surface 378 of shroud plate 300 and a radially outer tip 340 of second rail 320, within a range of from about 0.5 inches to about 0.7 inches, and a radius of curvature 322 of the smooth, arcuate profile of downstream pressure side edge 326 downstream from radial midpoint 336 and blended into radially outer edge 328 of notch 310 is at least about 0.2 inches. In a particular embodiment, second rail 320 has radial thickness 338 within a range of from about 0.60 inches to about 0.65 inches, and radius of curvature 322 is at least about 0.25 inches, which provides a particularly beneficial reduction in mechanical stress proximate to notch 310, thus reducing susceptibility of tip shroud 236 to creep and improving an operational life of blade 204. In this context, the term "substantially arcuate" indicates that the profile of downstream pressure side edge 326 downstream from at least radial midpoint 336 and blended into radially outer edge 328 need not define a perfect circular or elliptical arc. For example, in some embodiments, radius of curvature 322 may vary smoothly across the profile.

Shroud plate 300 extends radially between inner surface 378 and an outer surface 342, and has a radial thickness 384 defined therebetween. In the exemplary embodiment, thickness 384 varies circumferentially and/or axially across shroud plate 300. In alternative embodiments, thickness 384 is constant circumferentially and/or axially across shroud plate 300. In particular, in some embodiments, thickness 384 varies along notch 310. In alternative embodiments, thickness 384 is constant along notch 310.

Moreover, in certain embodiments, local thickness 384 of at least a first location 311 along notch 310 upstream from transition point 316 is at least twice local thickness 384 of at least a second location 313 along notch 310 downstream from transition point 316. In certain embodiments, increased thickness 384 of notch 310 upstream from transition point 316 facilitates an ability of shroud plate 300 to bear contact with an adjacent tip shroud 236 at a reduced peak stress level when rotor assembly 118 (shown in FIG. 2) is in operation, while decreased thickness 384 of notch 310 downstream from transition point 316 reduces a moment induced on airfoil 234 by portions of tip shroud 236 overhanging pressure side 264 of blade 204, thereby improving creep performance. For example, but not by way of limitation, local thickness 384 of first location 311 along notch 310 upstream from transition point 316 being at least twice local thickness 384 of second location 313 along notch 310 downstream from transition point 316 is enabled by reduced cooling requirements due to an absence of material replaced by notch 310. It should be understood that the at least first and second locations 311 and 313 are not limited to the precise location shown in FIG. 6.

For example, in the exemplary embodiment, shroud plate 300 has axial length 314 within a range of from about 3 inches to about 4 inches, and the profile in the X-Y plane of notch 310 is defined downstream of primary contact surface 332 by first plurality of points {1, 2, . . . , 29} joined with smooth continuous arcs. Exemplary local thickness 384 for each of the first plurality of points is given in Table 1 below. In certain embodiments, notch 310 having a thickness profile as set forth in Table 1 for first plurality of points {1, 2, . . . , 29} provides a particularly beneficial reduction in mechanical stress in tip shroud 236 and airfoil 234, thus reducing susceptibility of tip shroud 236 to creep and improving an operational life of blade 204.

In addition, certain embodiments include variations in the coordinate and thickness values set forth in Table 1 while preserving the advantages described above to a substantial degree. For example, in some embodiments, at least one of manufacturing tolerances and protective coatings cause each coordinate value and/or thickness value listed in Table 1 to vary, while preserving the advantages described above to a substantial degree. Accordingly, the values given in Table 1 are for a nominal thickness profile, and are subject to a tolerance. It will therefore be appreciated that typical tolerances, i.e., ±values, including any coating thicknesses, are additive to the coordinates and thicknesses given in Table 1.

In alternative embodiments, local thickness 384 along notch 310 varies in any other suitable fashion that enables blade 204 to function as described herein.

TABLE 1

| Point No. | X (inches) | Y (inches) | Thickness 384 (inches) |
|---|---|---|---|
| 1 | −0.00559 | −0.53926 | 0.09522 |
| 2 | 0.00206 | −0.51728 | 0.09671 |
| 3 | 0.00993 | −0.49538 | 0.09897 |
| 4 | 0.01808 | −0.47359 | 0.10197 |
| 5 | 0.02649 | −0.45189 | 0.10569 |
| 6 | 0.03519 | −0.43031 | 0.11008 |
| 7 | 0.04420 | −0.40886 | 0.11504 |
| 8 | 0.05358 | −0.38756 | 0.12053 |
| 9 | 0.06330 | −0.36642 | 0.12659 |
| 10 | 0.07329 | −0.34541 | 0.13326 |
| 11 | 0.08342 | −0.32446 | 0.14059 |
| 12 | 0.09361 | −0.30354 | 0.14854 |
| 13 | 0.10383 | −0.28263 | 0.15700 |

TABLE 1-continued

| Point No. | X (inches) | Y (inches) | Thickness 384 (inches) |
|---|---|---|---|
| 14 | 0.11405 | −0.26172 | 0.16564 |
| 15 | 0.12426 | −0.24082 | 0.17401 |
| 16 | 0.13446 | −0.21990 | 0.18123 |
| 17 | 0.14458 | −0.19895 | 0.18728 |
| 18 | 0.15408 | −0.17772 | 0.19272 |
| 19 | 0.16133 | −0.15563 | 0.19703 |
| 20 | 0.16394 | −0.13257 | 0.20006 |
| 21 | 0.16040 | −0.10961 | 0.20203 |
| 22 | 0.15244 | −0.08777 | 0.20409 |
| 23 | 0.14151 | −0.06726 | 0.20626 |
| 24 | 0.12765 | −0.04860 | 0.20729 |
| 25 | 0.11029 | −0.03303 | 0.20957 |
| 26 | 0.08953 | −0.02252 | 0.21264 |
| 27 | 0.06820 | −0.01323 | 0.21710 |
| 28 | 0.04609 | −0.00602 | 0.22418 |
| 29 | 0.02326 | −0.00160 | 0.23520 |
| 30 | 0.00000 | 0.00000 | 0.24945 |
| 31 | −0.00993 | 0.00000 | 0.26010 |
| 32 | −0.01985 | 0.00000 | 0.27126 |
| 33 | −0.02978 | 0.00000 | 0.28290 |
| 34 | −0.03971 | 0.00000 | 0.29500 |
| 35 | −0.04964 | 0.00000 | 0.30770 |
| 36 | −0.05956 | 0.00000 | 0.32085 |
| 37 | −0.06949 | 0.00000 | 0.33450 |
| 38 | −0.07942 | 0.00000 | 0.34863 |
| 39 | −0.08934 | 0.00000 | 0.36320 |
| 40 | −0.34680 | 0.00000 | — |

In addition, in certain embodiments, inclusion on blade 204 of at least two of (i) notch 310 having a profile in the X-Y plane based on the coordinates in Table 1, (ii) downstream pressure side edge 326 of second rail 320 blending into radially outer edge 328 of notch 310 upstream from transition point 316 in a smooth, continuous arcuate profile that extends downstream from at least radial midpoint 336 of second rail 320, and (iii) local thickness 384 of at least one location 311 along notch 310 upstream from transition point 316 being at least twice local thickness 384 of at least one location 313 along notch 310 downstream from transition point 316, facilitates an enhanced reduction of mechanical stresses in tip shroud 236 and/or airfoil 234, as compared to inclusion of solely one of these three features. Moreover, in certain embodiments, inclusion on blade 204 of all three of these features enhances reduction of mechanical stresses in tip shroud 236 and/or airfoil 234, as compared to including just one or two of these three features. Nevertheless, substantial benefits are still obtainable by including solely one of these three features on blade 204.

The exemplary methods and systems described herein overcome at least some disadvantages of known turbine blades by providing a tip shroud that includes a shroud plate having a notch defined along a pressure side edge. Specifically, the notch results in a corresponding absence of material of the shroud plate along the circumferential edge that would otherwise need to be cooled. In some embodiments, a primary contact surface of the pressure side edge is configured to couple against an adjacent tip shroud, and the notch extends at least partially downstream from the primary contact surface. Specifically, in some such embodiments, a specific shape of the notch enables a local shroud plate thickness along the primary contact surface and/or an upstream edge of the notch to be increased, facilitating an ability of the shroud plate to bear contact with an adjacent tip shroud at a reduced stress level, thereby improving creep performance. Also specifically, in certain embodiments, the tip shroud includes a leading shroud rail and a second, downstream shroud rail, and a downstream pressure side edge of the second rail blends into a radially outer edge of the notch in a smooth, continuous arcuate profile, also reducing stress concentrations proximate to the primary contact surface, thereby improving creep performance. Also specifically, in some embodiments, the local shroud plate thickness of at least a first location along an upstream portion of the notch is at least twice the thickness of at least a second location along a downstream portion of the notch, also facilitating an ability of the shroud plate to bear contact with an adjacent tip shroud at a reduced stress level, thereby improving creep performance. Also specifically, in certain embodiments, the absence of material along the shroud plate edge corresponding to the notch reduces or eliminates a requirement to provide active cooling directly to the circumferential edge proximate the notch, facilitating improved cooling efficiency for the shroud plate. In some such embodiments, the reduced cooling requirements further facilitate transverse cooling passages defined within the shroud plate being coupled directly in flow communication to a corresponding radially extending cooling passage in the airfoil, such that the tip shroud may not require a tip shroud plenum, thereby simplifying a design and manufacture of the tip shroud.

Exemplary embodiments of a turbine blade having a tip shroud notch are described above in detail. The turbine blade is not limited to the specific embodiments described herein, but rather, components and steps may be utilized independently and separately from other components and/or steps described herein. For example, the embodiments may also be used in combination with other systems and methods, and are not limited to practice with only the gas turbine engine assembly as described herein. Rather, the exemplary embodiment may be implemented and utilized in connection with many other rotary machine applications.

Although specific features of various embodiments of the invention may be shown in some drawings and not in others, this is for convenience only. Moreover, references to "one embodiment" in the above description are not intended to be interpreted as excluding the existence of additional embodiments that also incorporate the recited features. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A turbine blade comprising:
   an airfoil that extends from a root end to a tip end; and
   a tip shroud extending from said tip end, said tip shroud comprising:
      a shroud plate that comprises a pressure side edge, a leading edge, a radially inner surface, a radially outer surface, and a thickness defined between said radially inner surface and said radially outer surface;
      a first shroud rail adjacent said leading edge of said shroud plate; and
      a second shroud rail downstream from said first shroud rail, wherein said pressure side edge comprises:
         a primary contact surface configured to couple against an adjacent tip shroud; and
         a notch extending at least partially downstream from said primary contact surface and said second rail, wherein said notch comprises a transition point defined at a circumferentially inward-most point along said notch, and wherein said thickness of at least a first location along said notch, downstream from said second rail and upstream from said transition point, is at least twice said thickness of at least a second location along said notch, downstream from said transition point.

2. The turbine blade in accordance with claim 1, wherein a plane is defined transverse to a radial direction of said blade, a profile of said primary contact surface projected onto the plane is defined by a substantially straight line, such that said primary contact surface is oriented at a contact angle with respect to a circumferential direction of said blade.

3. The turbine blade in accordance with claim 2, wherein said contact angle is within a range of from about 30 degrees to about 65 degrees.

4. The turbine blade in accordance with claim 2, wherein a profile of said notch projected onto the plane is defined by a smooth, generally concave profile downstream from said primary contact surface.

5. The turbine blade in accordance with claim 4, wherein said shroud plate has an axial length within a range of from about 3 inches to about 4 inches, said profile of said notch projected onto the plane is defined by a first plurality of points having coordinates listed in Table 1 subject to a tolerance, the first plurality of points joined with smooth continuous arcs.

6. The turbine blade in accordance with claim 1, wherein said primary contact surface comprises a pressure side edge of said second rail.

7. The turbine blade in accordance with claim 6, wherein a downstream pressure side edge of said second rail blends into a radially outer edge of said notch upstream from said transition point in a smooth, continuous arcuate profile that extends downstream from at least a radial midpoint of said second rail.

8. A turbine blade comprising:
   an airfoil that extends from a root end to a tip end;
   a tip shroud extending from said tip end, said tip shroud comprising a shroud plate that comprises a pressure side edge, said pressure side edge comprises a notch;
   a first shroud rail adjacent a leading edge of said shroud plate; and
   a second shroud rail downstream from said first shroud rail, a downstream pressure side edge of said second rail blends into a radially outer edge of said notch in a smooth, continuous arcuate profile that extends downstream from at least a radial midpoint of said second rail, wherein said second rail comprises a rail thickness defined between a radially inner surface of said shroud plate and a radially outer tip of said second rail, said rail thickness is within a range of from about 0.5 inches to about 0.7 inches, said profile comprises a radius of curvature of at least about 0.2 inches.

9. The turbine blade in accordance with claim 8, wherein said notch comprises a transition point defined at a circumferentially inward-most point along said notch, said second rail blends into said radially outer edge of said notch upstream from said transition point.

10. The turbine blade in accordance with claim 8, wherein said pressure side edge further comprises a primary contact surface configured to couple against an adjacent tip shroud, said notch extends at least partially downstream from said primary contact surface, said primary contact surface comprises a pressure side edge of said second rail.

11. The turbine blade in accordance with claim 10, wherein a plane is defined transverse to a radial direction of said blade, a profile of said primary contact surface projected onto the plane is defined by a substantially straight line, such that said primary contact surface is oriented at a contact angle with respect to a circumferential direction of said blade.

12. The turbine blade in accordance with claim 11, wherein said contact angle is within a range of from about 30 degrees to about 65 degrees.

13. The turbine blade in accordance with claim 8, wherein said shroud plate further comprises a radially inner surface, a radially outer surface, and a plate thickness defined therebetween, said plate thickness of at least a first location along said notch upstream from said transition point is at least twice said plate thickness of at least a second location along said notch downstream from said transition point.

14. A turbine blade comprising:
an airfoil that extends from a root end to a tip end;
a tip shroud extending from said tip end, said tip shroud comprising a shroud plate that comprises:
a radially inner surface, a radially outer surface, and a thickness defined therebetween; and
a pressure side edge, said pressure side edge comprises a notch, said notch comprises a transition point defined at a circumferentially inward-most point along said notch, wherein said shroud plate has an axial length within a range of from about 3 inches to about 4 inches, a plane is defined transverse to a radial direction of said blade, a shape profile of said notch projected onto the plane is defined by a first plurality of points having coordinates listed in Table 1 subject to a tolerance, the first plurality of points joined with smooth continuous arcs, and a thickness profile along said notch for the first plurality of points is further listed in Table 1 subject to the tolerance.

15. The turbine blade in accordance with claim 14, wherein said thickness of at least a first location along said notch upstream from said transition point is at least twice said thickness of at least a second location along said notch downstream from said transition point.

16. The turbine blade in accordance with claim 14, further comprising:
a first shroud rail adjacent a leading edge of said shroud plate; and
a second shroud rail downstream from said first shroud rail, a downstream pressure side edge of said second rail blends into a radially outer edge of said notch in a smooth, continuous arcuate profile that extends downstream from at least a radial midpoint of said second rail.

17. The turbine blade in accordance with claim 16, wherein said second rail comprises a rail thickness defined between said radially inner surface of said shroud plate and a radially outer tip of said second rail, said rail thickness is within a range of from about 0.5 inches to about 0.7 inches, said profile comprises a radius of curvature of at least about 0.2 inches.

18. The turbine blade in accordance with claim 16, wherein said pressure side edge further comprises a primary contact surface configured to couple against an adjacent tip shroud, said notch extends at least partially downstream from said primary contact surface, said primary contact surface comprises a pressure side edge of said second rail.

* * * * *